June 11, 1929.                D. E. KELLOGG                1,716,587
                              CONDUIT FITTING
                            Filed Oct. 24, 1925

Inventor
Dorcey E. Kellogg
By
   Attorney

Patented June 11, 1929.

1,716,587

UNITED STATES PATENT OFFICE.

DORCEY E. KELLOGG, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed October 24, 1925. Serial No. 64,531.

This invention is directed to conduit fittings designed for use with threadless conduits and provides a simple and efficient means for securing conduit to a fitting. Details and features of the invention will appear from the specification and claims.

The invention is illustrated in the accompanying drawings as follows:—

Figure 1:
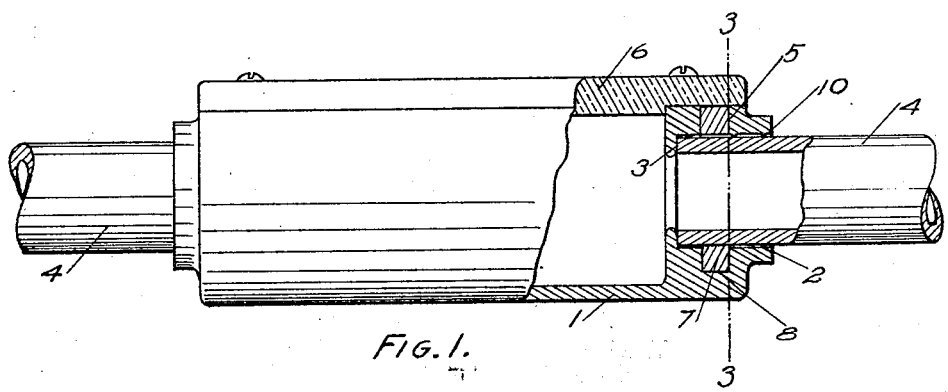
Figure 3:
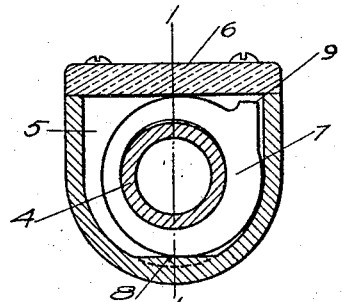

Fig. 1 shows a side elevation, partly in section on the line 1—1 in Fig. 3.

Figure 2:
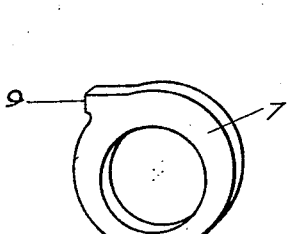

Fig. 2 a perspective view of an annular wedge.

Fig. 3 a section on the line 3—3 in Fig. 1.

1 marks the body of the fitting. This has a conduit-receiving opening 2 with the usual guard shoulder 3 adapted to receive a conduit 4.

A transverse socket 5 is arranged in the walls of the fitting, this socket extending from the opening 3 and through the upper wall of the conduit so as to be closed by the cover 6 when the cover 6 is in place.

An annular wedge 7 is arranged in the socket 5 around the conduit 4 and is adapted to operate between a shoulder 8 at the lower end of the socket and the inserted conduit 4, the shoulder 8 being in the part of the walls nearer the conduit so as to permit of an annular wedging action but preferably at the bottom of the socket. The annular wedge is in the form of a ring and wedging circumferentially and is provided with a tappet surface 9 which when the wedge is loosely in place is slightly above the upper surface of the box so that as it is hammered down into the socket the wedge is driven around the shoulder 8 and the inserted conduit. The conduit opening 2 preferably has protuberances 10 adapted to indent the conduit as it is forced against them assisting in holding the conduit and also in penetrating any enamel there may be on the conduit so as to assure an electrical connection.

What I claim as new is:—

1. In a conduit fitting, the combination of a body having a conduit-receiving opening and a transverse socket extending from the opening through the wall of the body at one side of the opening, the wall of the socket forming a wedge shoulder; and an annular wedge around an inserted conduit and between the shoulder and said inserted conduit.

2. In a conduit fitting, the combination of a body having a conduit receiving opening and a transverse socket extending from the opening through the wall at one side of the opening and the wall of the opening to the socket forming a wedge shoulder; and an annularly acting wedge in the socket between the shoulder and an inserted conduit having a striking portion protruding initially from the opening from the socket.

3. In a conduit fitting, the combination of a body having a conduit-receiving opening and a transverse slot extending from the opening through the wall of the body at one side of the opening, the wall of the socket forming a wedge shoulder; a wedge in the socket between the shoulder and an inserted conduit and initially protruding from the opening; and a fitting cover covering the socket opening.

In testimony whereof I have hereunto set my hand.

DORCEY E. KELLOGG.